Figure 1:
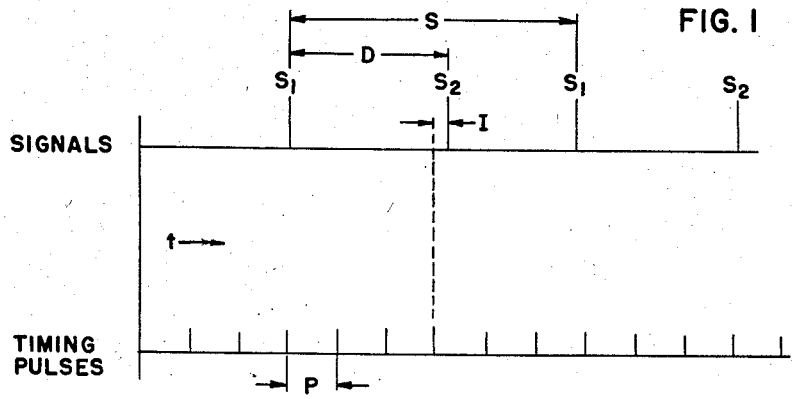

April 14, 1959  W. A. BIRGE  2,882,495

PRECISION INTERVAL TIMER

Filed July 18, 1956

INVENTOR
WARREN A. BIRGE
BY
ATTORNEY

United States Patent Office 2,882,495
Patented Apr. 14, 1959

2,882,495

PRECISION INTERVAL TIMER

Warren Arthur Birge, Middle River, Md., assignor to The Martin Company, a corporation of Maryland Application July 18, 1956, Serial No. 598,719

8 Claims. (Cl. 324—68)

The present invention relates to a method and apparatus for measuring the time interval between a pair of signals by means of a timing pulse count, and more particularly to a method and apparatus for measuring the fraction of timing pulse separation by which the time interval between a pair of signals differs from the time interval represented by a timing pulse count.

It is well known that the time interval between a pair of signals may be measured approximately by generating a series of timing pulses accurately separated in time, and then counting the number of timing pulses occurring during the interval. If the interval of time under measurement is not exactly equal to the time interval represented by a timing pulse count the measurement will be in error by the fraction of timing pulse separation by which the two intervals differ.

The present invention provides a method and electrical circuits for accurately measuring the fraction of timing pulse separation by which a time interval under measurement differs from a time interval represented by a timing pulse count.

In accordance with the invention the pair of signals which define the time interval to be measured are repeated at a preselected recurrence frequency $f_s$. Timing pulses for measuring the interval are generated at a frequency related to the recurrence frequency of the signal pair in a manner such that the relative phase of the signal pair and the timing pulses changes by the time interval between a pair of timing pulses, or in technical terms by 360°, for a preselected number of recurrences N of the signal pair. Under this condition the relationship of the repetition frequency of the timing pulses $f_p$ to the recurrence frequency of the signal pair $f_s$ is characterized by the equation $f_p = kf_s \pm f_s/N$, where $k$ is a numerical integer quantity.

Due to the change in relative phase a timing pulse count between the signals during a portion of the period required for N recurrences of the signal pair will be larger by 1 than a timing pulse count during the remainder of the period. Therefore, a repeated timing pulse count between the signals during the period required for a 360° phase shift will produce a series of odd pulse counts and a series of even pulse counts. Moreover, the time during which the repeated count produces the series of odd pulse counts relative to the time during which it produces the series of even pulse counts is directly related to the fraction of timing pulse separation by which the time interval between the signal pair exceeds the time interval represented by the larger count of the even and odd timing pulse counts. Thus the time interval between the signal pair may be measured in terms of a timing pulse count by producing a first indication representative of the number of pulses in the larger count of the even and odd pulse counts, and producing a second indication representative of the number of pulse counts in the series of odd pulse counts relative to the number of pulse counts in the series of even pulse counts.

The present invention therefore provides a system wherein the fraction of timing pulse separation by which a time interval under measurement differs from a time interval represented by a timing pulse count may be measured by simple electrical pulse counting circuitry of the on-off type, thereby reducing reliance upon circuit characteristics to a minimum.

Further, the present invention provides a method and electrical circuits wherein the time interval between a pair of signals is measurable to an accuracy of better than 0.01 microsecond.

Figure 2:
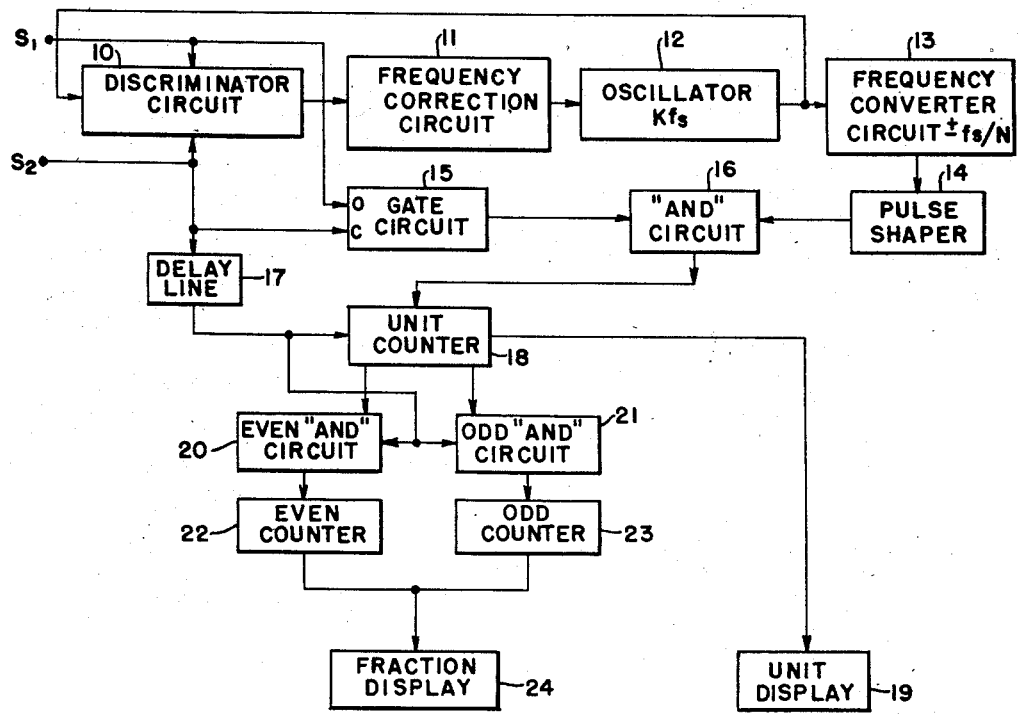

The invention can best be understood by referring to the accompanying drawing in which:

Fig. 1 is a time scale diagram showing the time relationship, as set forth by the invention, between a recurring pair of signals and a series of timing pulses; and Fig. 2 is a block diagram of a precision interval timer embodying the invention.

Referring to Fig. 1 a time interval to be measured D is plotted on a time scale, the signals defining the time interval being denoted by the symbols $S_1$ and $S_2$. In accordance with the invention the signals are generated at a preselected recurrence frequency $f_s$, each signal being separated from its successor by the interval S. Timing pulses generated to measure the time interval D are plotted on a second time scale synchronized with the signal time scale to show the time relationship therebetween. The timing pulses are generated at a preselected repetition frequency $f_p$, each pulse being separated from its successor by the time interval P.

In accordance with the invention the timing pulse repetition frequency $f_p$ is selected so that the relative phase of the timing pulses and the signals changes with every recurrence of the signal pair, and so that a preselected number of recurrences of the signal pair, N, is required for the relative phase of the timing pulses and the signal pair to change by the time interval P, or by 360°. These conditions are met if the timing pulse frequency $f_p$ is above or below a harmonic of the recurrence frequency $f_s$ by an amount $f_s/N$. Thus the frequency $f_p$ is characterized by the equation $f_p = kf_s \pm f_s/N$, where $k$ is a numerical integer quantity.

At some arbitrary time therefore, signal $S_1$ will coincide with a timing pulse. At this time an approximate measurement of the time interval D may be effected by counting the number of timing pulses, $n$, occurring between signal $S_1$ and signal $S_2$. If signal $S_2$ is not coincident with the $n$th timing pulse this measurement will be in error by I, the fraction of the interval P, by which signal $S_2$ is separated from the $n$th timing pulse.

The repeated phase shift between the signals and the timing pulses resulting from the frequency relationship set forth by the invention provides a means for measuring the interval I. Assume that the direction of the phase shift is such that the signals are displaced to the left of their original position in Fig. 1 for every recurrence of the signal pair. In that event Fig. 1 indicates that the condition of counting $n$ pulses between signals $S_1$ and $S_2$ can only continue until signal $S_2$ coincides with a timing pulse. Thereafter $n-1$ pulses will be counted until signal $S_1$ again coincides with a timing pulse. Thus, if the timing pulses occurring between signals $S_1$ and $S_2$ are repeatedly counted, a series of odd pulse counts and a series of even pulse counts will be registered during the period required for a 360° phase shift, or for N recurrences of the signal pair. In addition, it can be shown that the number of even pulse counts relative to the number of odd pulse counts is indicative of the fraction of the interval P taken up by the interval I.

Since N recurrences of the signal pair are required for a phase shift of P seconds, the relative phase of the signals and pulses changes at the rate of $P/N$ seconds for each recurrence of the signal pair, or, because the recurrence frequency of the signal pair is $f_s$, at the rate of $Pf_s/N$ seconds per second. It will therefore require a time $T_i = IN/Pf_s$ for the phase to shift by the time interval I. In the same manner, the time required for the phase to shift by the interval P is, $T_p = N/f_s$. $T_i/T_p$ is therefore equal to $I/P$, or, $I = T_i P/T_p$. Since P is known it remains to determine the values of $T_i$ and $T_p$ in order to solve the equation for I.

A study of Fig. 1 reveals that $T_i$ is equal to the time during which the repeated pulse count in the interval D yields $n$ pulses per count. Fig. 1 also reveals that the time during which the repeated pulse count yields $n-1$ pulses per count is equal to $T_p - T_i$. Therefore the time during which an $n$ pulse count is produced relative to the time during which an $n-1$ pulse count is produced is indicative of the fraction $T_i/T_p$. Otherwise stated, the time during which a repeated pulse count for N recurrences of the signal pair produces a series of even pulse counts or a series of odd pulse counts relative to the time during which the repeated count produces both series of counts is indicative of the fraction $T_i/T_p$ and therefore of the fraction of the interval P taken up by the interval I.

The change from $n$ to $n-1$ pulses in the repeated pulse count may therefore be employed as an indication of the duration of $T_p$ and $T_i$. For example, $T_i$ and $T_p$ may be directly measured by timing circuitry adapted to be started and stopped by a change in the pulse count. Alternatively, circuitry adapted to effect a count of the number of pulse counts in a series of even pulse counts relative to the number of pulse counts in a series of odd pulse counts may be employed since the number of pulse counts in a series is directly related to the time required to produce that series.

Fig. 1 also reveals that the time interval D is equal to the time interval represented by the pulse count $n$, or the larger of the two possible pulse counts, plus the time interval I. Time interval D may therefore be measured in terms of a timing pulse count by producing a first indication representative of the larger pulse count possible during the interval D, and producing a second indication representative of the number of odd pulse counts relative to the number of even pulse counts registered by a repeated pulse count during the period required for a phase shift of 360°.

In Fig. 2 an interval timer unit wherein counting circuitry is employed to measure the time interval D is illustrated schematically in block diagram form.

A portion of the circuitry in the timer unit performs the function of generating the timing pulses at the frequency $f_p = kf_s \pm f_s/N$. This pulse generating portion includes discriminator circuit 10, frequency correction circuit 11, oscillator 12, frequency converter circuit 13, and pulse shaper 14. In order to insure that the pulse repetition frequency $f_p$ is accurately related to the signal recurrence frequency $f_s$ in accordance with the above equation, the pulse generating circuitry is synchronized to the frequency $f_s$. Accordingly, signals $S_1$ and $S_2$ are coupled into discriminator circuit 10 and frequency correction circuit 11 is coupled between the discriminator circuit and oscillator 12. Oscillator 12, preferably crystal-controlled, is set to run at the preselected harmonic $kf_s$ of the recurrence frequency of the signal pair. A portion of the output of oscillator 12 is fed back to discriminator circuit 10 which is adapted to compare the output frequency of the oscillator with the recurrence frequency of the signal pair, and to produce an error signal the polarity and amplitude of which indicate the direction and magnitude of any departure of the frequency output of the oscillator from the frequency $kf_s$. The error signal is coupled into the frequency correction circuit which is adapted to adjust the oscillator to the frequency $kf_s$ in response to the error signal.

The synchronized output of oscillator 12 is coupled into frequency converter circuit 13 which is adapted to algebraically add the plus or minus frequency component $f_s/N$ to the harmonic frequency $kf_s$. As examples of circuitry capable of performing this function, frequency converter circuit 13 may be a beat frequency generator or a mechanical phase shifter. In either event the output of the frequency converter circuit will be the desired frequency $f_p$. This output is applied to the pulse shaper 14 which produces at its output a series of timing pulses separated by the interval P.

A repeated count of the number of timing pulses occurring during the time interval D is effected by another portion of the interval timer which includes gate circuit 15, "and" circuit 16, delay line 17, unit counter 18 and unit display 19. Signals $S_1$ and $S_2$ are coupled to the opening and closing terminal, respectively, of gate circuit 15. The output gate voltage from gate circuit 15 and the pulses from pulse shaper 14 are coupled into "and" circuit 16. The "and" circuit is adapted to pass the pulses to its output only when the gate is opened. In this manner the gate opens in response to signal $S_1$ to start a flow of timing pulses to the output of the "and" circuit, and closes in response to signal $S_2$ to stop the flow.

The pulse output of the "and" circuit is coupled into unit counter 18 which is reset by signal $S_2$ to begin a new count after each recurrence of the signal pair. In order to insure that the unit counter completes a timing pulse count during the interval D, signal $S_2$ is delayed slightly by delay line 17 before being used to reset the unit counter and read the contents of unit counter 18 into the unit display 19. The unit counter is therefore repeatedly actuated into effecting a count by the timing pulse flow started by signal $S_1$, and repeatedly deactuated to stop effecting a count by signal $S_2$. In this manner the unit counter repeatedly effects a count of the number of timing pulses occurring during the time interval D. Finally the pulse count out of unit counter 18 is coupled into unit display 19 which is adapted to produce an indication representative of the larger count of the pulse counts registered by the unit counter.

The remainder of the interval timer is adapted to effect a count of the number of odd timing pulse counts and the number of even timing pulse counts registered by unit counter 18 and thus to produce an indication of $T_i$ and $T_p$. This circuitry includes even and odd "and" circuits 20 and 21, even and odd counters 22 and 23, and fraction display 24.

The first stage of the unit counter 18 supplies two outputs, one of which enables the even "and" circuit if an even count has been registered by the unit counter 18 and in the interval D, and the other of which enables the odd "and" circuit if an odd count has been registered by the unit counter 18 in the interval D. After a delay produced by delay line 17, sufficient to allow the counter and gate circuits to settle, pulse $S_2$ is applied to the even and odd "and" circuits 20 and 21 to produce a pulse output in whichever "and" circuit has been enabled by the unit counter. A count is thus registered in even counter 22 for each even pulse count registered by unit counter 18, and in odd counter 23 for each odd pulse count registered by unit counter 18.

The outputs of the even counter and the odd counter are coupled into the fraction display 24. Fraction display 24 is adapted to produce an indication representative of the number of even timing pulse counts (the output of even counter 22) relative to the number of odd timing pulse counts (the output of odd counter 23) produced by the unit counter during the period required for N recurrences of the signal pair. The sum of the fraction display and unit display is representative of the timing pulse count to the fraction between signals $S_1$ and $S_2$, and, multiplied by the timing pulse separation P, is an accurate measure of the interval D.

The present invention further improves the accuracy of signal separation measurement by its ability to substantially reduce an error common to all digital type timing devices, that error being introduced by the finite width of the timing pulses.

In any practical counter a minimum timing pulse width is required to produce a count registration. If the actual width of the timing pulse exceeds this minimum width it then becomes possible for the leading edge of the gate enabling the counter to occur later in time than the leading edge of a given timing pulse and still register that timing pulse as a count. Thus, if the timing pulses are arbitrarily phased with respect to signals $S_1$ and $S_2$, and the interval between $S_1$ and $S_2$ is measured only once, there exists a probability equal to the ratio of the actual timing pulse width $w_a$ minus the minimum timing pulse width $w_m$ to the timing pulse spacing P, or $(w_a-w_m)/P$, that an erroneous unit count will be registered.

The method of interval measurement provided by the present invention reduces the above uncertainty to a bias error which can always be calibrated out. It has been shown hereinbefore that without taking into consideration the finite width of the timing pulses, the percentage of the time that $n$ counts are registered in the unit counter is equal to $I/P$. Taking the width of the pulse into consideration changes this ratio to $[I+(w_a-w_m)]/P$ since $n$ pulses will be counted during the $(w_a-w_m)$ interval as well. Thus the increment $(w_a-w_m)$ appears as an additional interpolation which may be biased out of the fraction display 24 by suitable calibration.

Preferred embodiments of the invention have been described. Various changes and modifications however may be made within the scope of the invention as set forth in the appended claims.

I claim:

1. The method of measuring the time interval between a first and a second signal, which signals have a recurrence frequency $f_s$, comprising generating a series of timing pulses having a frequency $f_p$ related to the said recurrence frequency $f_s$ in a manner such that the relative phase of the said signals and the said timing pulses changes for every recurrence of the said first and second signal pair, producing a preselected number of recurrences N of the said signal pair to change the relative phase between the said signals and the said timing pulses by the time interval between a pair of the said timing pulses, in accordance with the equation $$f_p=kf_s\pm f_s/N$$

where $k$ is a numerical integer quantity, repeatedly effectiing a count of the number of timing pulses which occur during the time interval between said first signal and said second signal to produce a series of odd timing pulse counts and a series of even timing pulse counts, effecting a count of the number of said odd timing pulse counts, effecting a count of the number of said even timing pulse counts, producing a first indication representative of the number of timing pulses in the larger count of the said even and odd timing pulse counts, and producing a second indication representative of the number of said odd timing pulse counts relative to the number of said even timing pulse counts, whereby said first indication is representative of a unit timing pulse count between said first and second signals, and said second indication is representative of the fraction of the time interval between said timing pulses by which the time interval between said first and second signals exceeds the time interval represented by the said unit timing pulse count.

2. The method of measuring the fraction of timing pulse separation by which the time interval between a first and a second signal, which signals have a recurrence frequency $f_s$, differs from the time interval represented by a series of timing pulses having a frequency $f_p$ related to the said recurrence frequency $f_s$ in a manner such that the relative phase of the said signals and the said timing pulses changes by the time interval between a pair of the said timing pulses for a preselected number of recurrences N of the said first and second signal pair, which said frequency $f_p$ is characterized by the equation $f_p=kf_s\pm f_s/N$, where $k$ is a numerical integer quantity, which method comprises repeatedly effecting a count of the number of timing pulses which occur during the time interval between said first signal and said second signal to produce a series of odd timing pulse counts and a series of even timing pulse counts, for N recurrences of the said signal pair, effecting a count of the number of said odd timing pulse counts, effecting a count of the number of said even timing pulse counts, and producing an indication representative of the number of said odd timing pulse counts relative to the number of said even timing pulse counts, whereby said indication is also representative of the said fraction of timing pulse separation.

3. The method of measuring the fraction of timing pulse separation by which the time interval between a first and a second signal, which signals have a recurrence frequency $f_s$, differs from the time interval represented by a series of timing pulses having a frequency $f_p$ related to the said recurrence frequency $f_s$ in a manner such that the relative phase of the said signals and the said timing pulses changes by the time interval between a pair of the said timing pulses for a preselected number of recurrences N of the said first and second signal pair, which said frequency $f_p$ is characterized by the equation $f_p=kf_s\pm f_s/N$, where $k$ is a numerical integer quantity, which method comprises repeatedly effecting a count of the number of timing pulses which occur during the time interval between said first signal and said second signal to produce two series of timing pulse counts for N recurrences of the said signal pair, which said timing pulse counts differ by 1, and producing an indication representative of the time during which the said repeated count produces one of the said two series of timing pulse counts relative to the time during which the said repeated count produces both of the said series of timing pulse counts, whereby said indication is also representative of the said fraction of timing pulse separation.

4. The method of measuring the time interval between a first and a second signal, which signals have a recurrence frequency $f_s$, comprising generating a series of timing pulses having a frequency $f_p$ related to the said recurrence frequency $f_s$ in a manner such that the relative phase of the said signals and the said timing pulses changes for every recurrence of the said first and second signal pair, producing a preselected number of recurrences N of the said signal pair to change the relative phase between the said signals and the said timing pulses by the time interval between a pair of the said timing pulses, in accordance with the equation $f_p=kf_s\pm f_s/N$, where $k$ is a numerical integer quantity, repeatedly effecting a count of the number of timing pulses which occur during the time interval between said first signal and said second signal to produce two series timing pulse counts, which said timing pulse counts differ by 1, producing a first indication representative of the number of timing pulses in the larger count of the said timing pulse counts, and producing a second indication representative of the time during which the said repeated count produces one of the said two series of timing pulse counts relative to time during which the said repeated count produces both of the said series of timing pulse counts, whereby said first indication is representative of a unit timing pulse count between said first and second signals, and said second indication is representative of the fraction of the time interval between said timing pulses by which the time interval between said first and second signals exceeds the time interval represented by the said unit timing pulse count.

5. Electrical apparatus for measuring the time interval between a first and a second signal, which said signals have a recurrence frequency $f_s$, comprising a generating circuit for producing a series of timing pulses at a frequency $f_p$ related to the said recurrence frequency $f_s$ in a manner such that the relative phase of the said signals and the said timing pulses changes by the time interval between a pair of the said timing pulses for a preselected number of recurrences N of the said first and second signal pair, which said frequency $f_p$ is characterized by the equation $f_p = kf_s \pm f_s/N$, where $k$ is a numerical integer quantity, a gating circuit coupled to said generating circuit for starting and stopping the output of timing pulses therefrom, and connected to be responsive to said first and second signals, to open in response to said first signal, and to close in response to said second signal, a first counting circuit coupled to the output of said pulse generating circuit for repeatedly effecting a count of the number of timing pulses which occur during the interval between said first and second signals, and for producing a series of odd timing pulse counts and a series of even timing pulse counts, for N recurrences of the said signal pair, a second counting circuit coupled to said first counting circuit for effecting a count of the number of said odd timing pulse counts, a third counting circuit coupled to said first counting circuit for effecting a count of the number of said even timing pulse counts, a first indicating circuit coupled to said first counting circuit for producing a first indication representative of the number of timing pulses in the larger count of said even and odd timing pulse counts, and a second indicating circuit coupled to said second and third counting circuits for producing a second indication representative of the number of said odd timing pulse counts relative to the number of said even timing pulse counts, whereby said first indication is representative of a unit timing pulse count between said first and second signals, and said second indication is representative of the fraction of the time interval between said timing pulses by which the time interval between said first and second signals exceeds the time interval represented by the said unit timing pulse count.

6. Electrical apparatus for measuring the time interval between a first and a second signal, which said signals have a recurrence frequency $f_s$, comprising a generating circuit for producing a series of timing pulses at a frequency $f_p$ related to the said recurrence frequency $f_s$ in a manner such that the relative phase of the said signals and the said timing pulses changes by the time interval between a pair of the said timing pulses for a preselected number of recurrences N of the said first and second signal pair, which said frequency $f_p$ is characterized by the equation $f_p = kf_s \pm f_s/N$, where $k$ is a numerical integer quantity, a counting circuit actuable by said first signal and deactuable by said second signal, and coupled to said pulse generating circuit for repeatedly effecting a count of the number of timing pulses which occur during the time interval between said first and second signals, and for producing two series of timing pulse counts for N recurrences of the said signal pair, one of which said timing pulse counts is larger than the other by 1, a first indicating circuit coupled to said first counting circuit for producing a first indication representative of the number of timing pulses in the said larger timing pulse count, and a second indicating circuit coupled to said counting circuit for producing a second indication representative of the time during which the said counting circuit produces the said series of larger timing pulse counts relative to the time during which the said counting circuit produces both of the said series of timing pulse counts, whereby said first indication is representative of a unit timing pulse count between said first and second signals, and said second indication is representative of the fraction of the time interval between said timing pulses by which the time interval between said first and second signals exceeds the time interval represented by the said unit timing pulse count.

7. Electrical apparatus in accordance with claim 6 in which the said generating circuit is connected to be responsive to at least one of the said first and second signals, and adapted to be synchronized to the recurrence frequency $f_s$ of the said first and second signal pair.

8. Electrical apparatus for measuring the time interval between a first and a second signal, which said signals have a recurrence frequency $f_s$, comprising a generating circuit for producing a series of timing pulses at a frequency $f_p$ related to the said recurrence frequency $f_s$ in a manner such that the relative phase of the said signals and the said timing pulses changes by the time interval between a pair of the said timing pulses for a preselected number of recurrences N of the said first and second signal pair, which said frequency $f_p$ is characterized by the equation $f_p = kf_s \pm f_s/N$, where $k$ is a numerical integer quantity, said pulse generating circuit including an oscillator circuit for producing an output voltage having a repetition frequency $kf_s$, said oscillator circuit being connected to be responsive to at least one of the said first and second signals, and adapted to be synchronized to the recurrence frequency $f_s$ of the said first and second signal pair, a frequency converting circuit coupled to said oscillator circuit for changing the frequency of the output voltage of said oscillator circuit by $\pm f_s/N$, and for producing at its output a voltage having the frequency $kf_s \pm f_s/N$, and a pulse shaping circuit coupled to said frequency converting circuit for shaping the output voltage of the said frequency converting circuit into the said series of timing pulses, a gating circuit coupled to said pulse generating circuit for starting and stopping the output of timing pulses therefrom, and connected to be responsive to said first and second signals, to open in response to said first signal, and to close in response to said second signal, a first counting circuit coupled to the output of said pulse generating circuit for repeatedly effecting a count of the number of timing pulses which occur during the interval between said first and second signals, and for producing a series of odd timing pulse counts and a series of even timing pulse counts, for N recurrences of the said signal pair, a second counting circuit coupled to said first counting circuit for effecting a count of the number of said odd timing pulse counts, a third counting circuit coupled to said first counting circuit for effecting a count of the number of said even timing pulse counts, a first indicating circuit coupled to said first counting circuit for producing a first indication representative of the number of timing pulses in the larger count of said even and odd timing pulse counts, and a second indicating circuit coupled to said second and third counting circuits for producing a second indication representative of the number of said odd timing pulse counts relative to the number of said even timing pulse counts, whereby said first indication is representative of a unit timing pulse count between said first and second signals, and said second indication is representative of the fraction of the time interval between said timing pulses by which the time interval between said first and second signals exceeds the time interval represented by the said unit timing pulse count.

References Cited in the file of this patent

UNITED STATES PATENTS

| | | |
|---|---|---|
| 2,560,124 | Mofenson | July 10, 1951 |
| 2,665,410 | Burbeck | Jan. 5, 1954 |
| 2,665,411 | Frady | Jan. 5, 1954 |
| 2,738,461 | Burbeck | Mar. 13, 1956 |